3,488,365
SYNTHESIS OF 11-KETO-$\Delta^{1,3,5(10)}$-ESTRATRIENES

Samuel C. Pan, Metuchen, Pacifico A. Principe, South River, Barbara Junta, Somerset, and Allen I. Cohen, East Brunswick, N.J., assignors to E. R. Squibb & Sons, Inc., New York, N.Y., a corporation of Delaware
No Drawing. Filed Aug. 31, 1966, Ser. No. 576,254
Int. Cl. C07c *167/14, 169/10, 167/00*
U.S. Cl. 260—397.45     2 Claims

---

ABSTRACT OF THE DISCLOSURE 11-keto-$\Delta^{1,3,5(10)}$-estratrienes are prepared from 10β,11β-dihydroxy-19-nor-$\Delta^4$-androstenes by first oxidizing the dihydroxyandrostene to the corresponding 10β-hydroxy-11-keto derivative and then dehydrating such derivative.

---

This invention relates to and has for its object the provision of an improved process for preparing 11-keto-estranes (11-keto-$\Delta^{1,3,5(10)}$-estratrienes).

It has been found that a 10β,11β-dihydroxy-19-nor-$\Delta^4$-androstene may be converted to an 11-ketoestrane derivative in high yield by a two-step process without any substantial formation of undesired by-products. In essence, therefore, the process of this invention entails oxidizing a 10β,11β-dihydroxy-19-nor-$\Delta^4$-androstene, by treatment with an oxidizing agent such as chromic anhydride, to the corresponding 10β-hydroxy-11-keto-19-nor-$\Delta^4$-androstene, which are new compounds of this invention; and dehydrating the latter, as by treatment with concentrated sulfuric acid in a glacial acetic acid medium, to yield the desired 11-ketoestrane final product.

Among the suitable starting steroids are included any of the 10β,11β-dihydroxy-19-nor-$\Delta^4$-androstenes. The preferred starting steroids, however, are the 3,17-dioxygenated 10β,11β-dihydroxy-19-nor-$\Delta^4$-androstene, such as 10β,11β-dihydroxy-19-nor-$\Delta^4$-androstene-3,17-dione, which is a new compound of this invention. To prepare these starting materials the corresponding 10β-hydroxy-11-unsubstituted or 10,11-unsubstituted 19-nor-$\Delta^4$-androstene is subjected to the action of enzymes of an 11β-hydroxylating microorganism, the reaction being carried out in the usual manner by culturing the microorganism in the presence of the steroid, or by treating the steroid with non-proliferating cells of the microorganism, or by intermixing the steroid with 11β-hydroxylating enzymes previously obtained from the microorganism. The conditions for such microbial reaction are well known in the art and are similar to those specified in U.S. Patent No. 3,179,698.

The preferred 11β-hydroxylating microorganism that can be used as the source of the 11β-hydroxylating enzyme is *Curvularia lunata*.

The following examples illustrate the invention (all temperatures being in centigrade):

EXAMPLE 1

10β,11β-dihydroxy-19-nor-$\Delta^4$-androstene-3,17-dione (i) PREPARATION OF 10β,11β-DIHYROXY-19-NOR-$\Delta^4$-ANDROSTENE-3,17-DIONE

*A. Fermentation.*—Surface growth from each of three 10-day-old agar slant cultures of *Curvularia lunata* (QM–120–L), Army Quartermaster, Natick, Mass., the slant containing as a nutrient medium (A):

| | Grams |
|---|---|
| Glucose | 10 |
| Yeast extract | 2.5 |
| $K_2HPO_4$ | 1 |
| Agar | 20 |

Distilled water to 1 liter.

is suspended in 5 ml. of a 0.01% sodium lauryl sulfate aqueous solution. One ml. portions of the suspension are used to inoculate ten 250 ml. conical flasks, each containing 50 ml. of the following sterilized medium (B):

| | Grams |
|---|---|
| Dextrose | 10 |
| Corn steep liquor | 6 |
| $NH_4H_2PO_4$ | 3 |
| Yeast extract | 2.5 |
| $CaCO_3$ | 2.5 |

Distilled water to 1 liter.

After 72 hours of incubation at 25° with continuous rotary agitation (280 cycles per minute; 2 inch stroke), 10% vol./vol. transfers are made to forty 250 ml. conical flasks, each containing 50 ml. of fresh sterilized medium B plus 500 micrograms/ml. of 19-nor-$\Delta^4$-androstene-3,17-dione. The steroid is added by supplementing each flask with 0.25 ml. of a sterile solution of the steroid in N,N-dimethylformamide containing 100 mg./ml. of steroid. A total of 1.0 gram is used. After 5 days of further incubation, the contents of the flasks are pooled through a Seitz clarifying pad. The flasks, mycelium and pads are washed with successive 50 ml. portions of warm water. The combined filtrate and washings have a volume of 2,000 ml.

*B. Isolation and Characterization.* — The combined filtrate and washings (2,000 ml.) are extracted three times with 500 ml. portions of methyl isobutyl ketone. The combined methyl isobutyl ketone extracts are washed with water, dried over anhydrous sodium sulfate and concentrated to dryness under vacuum, leaving about 300 mg. of crude product. This material is chromatographed on a thin layer of Silica Gel GF with chloroform containing 5% (by volume) methanol as the developing solvent. The uv-absorbing band moving with 2/10 mobility of the substrate, i.e., 19-norandrostenedione, is eluted with a 1:1 (by volume) mixture of methanol and chloroform. After exaporating off the solvent the residue is partitioned between chloroform and a 1:1 (by volume) mixture of water and methanol. The chloroform phase, upon evaporation under vacuum to dryness, yields crystalline 10β,11β-dihydroxy-19-nor-$\Delta^4$-androstene-3,17-dione. It is recrystallized from acetone-hexane to yield about 25 mg. of the pure product, M.P. about 243°–244°, $\lambda_{max.}^{alc}$ 232 m$\mu$ ($\epsilon$ 12,950). $\gamma_{max.}^{CDCl_3}$ 3592, 3450 (br.), 1733, 1669, 1600 cm.$^{-1}$ NMR signals: $\tau$=8.81 p.p.m. (18—$CH_3$); $\tau$=5.28 p.p.m. (11α—H); $\tau$=4.22 p.p.m. (4—H); $\tau$=6.61 p.p.m. (H-bonded 10β—OH and 11β—OH).

(ii) ALTERNATIVE PREPARATION OF 10β,11β-DIHYDROXY-19-NOR-$\Delta^4$-ANDROSTENE-3,17-DIONE Following the procedure of step (i), but substituting an equivalent amount of 10β-hydroxy-19-nor-$\Delta^4$-androstene-3,17-dione for the 19-nor-$\Delta^4$-androstene-3,17-dione, 10β,11β-dihydroxy-19-nor-$\Delta^4$-androstene-3,17-dione having an M.P. of about 243°–244° C. is obtained.

Moreover, by substituting the following steroid substrates for the 19-nor-Δ⁴-androstene-3,17-dione in the procedure of Example 1, the indicated product is obtained:

| Steroid Substrate | Product |
|---|---|
| 19-nor-17α-methyl-testosterone | 10β,11β-dihydroxy-19-nor-17α-methyltestosterone. |
| 19-nor-17α-ethynyl-testosterone | 10β,11β-dihydroxy-19-nor-17α-ethynyltestosterone |
| 19-nortestosterone | 10β,11β-dihydroxy-19-nortestosterone. |

Moreover, the following organisms can also be used to convert 10β-hydroxy-19-norandrostenedione to 10β,11β-dihydroxy-19-norandrostenedione:

*Phycomyces blakesleeanus* (CBS) (Centraalbureau voor schimmelcultures, Baarn, Netherlands)
*Coniothyrium hellebori* (ATCC 12522)
*Corticium microsclerotia* (NRLL 2727)

EXAMPLE 2

10β-hydroxy-11-keto-19-nor-Δ⁴-androstene-3,17-dione

To 10 ml. of a solution of 25 mg. of 10β,11β-dihydroxy-19-nor-Δ⁴-androstene-3,17-dione in acetone is added 0.1 ml. of a reagent prepared by dissolving 20 g. of chromic anhydride and 32 g. of concentrated sulfuric acid in 100 ml. of water. After allowing the reaction mixture to stand at room temperature for 10 minutes, the excess chromic anhydride is reduced by the addition of one drop of 95% ethanol. The reaction mixture is then diluted with 40 ml. of water and the steroids are extracted three times with 10 ml. portions of chloroform. After evaporating off the chloroform, the residue is chromatographed on Silica Gel GF plate in exactly the same way as described above in Example 1. The main uv-absorbing band is eluted, partitioned and evaporated to dryness in the same manner to give pure 10β-hydroxy-19-nor-Δ⁴-androstene-3,11,17-trione.

$\gamma_{max.}^{CCl_4}$ 3506, 1753, 1703, 1692, 1635. NMR signals: τ=9.07 p.p.m. (18—CH₃); τ=4.18 p.p.m. (4—H); τ=6.32 p.p.m. (H-bond in 10β-OH and 11-keto); τ=7.49 p.p.m. (12α and 12β-H) $\lambda_{max.}^{alc}$ 232 mμ

Similarly, by following the procedure of Example 2, but substituting 10β,11β-dihydroxy-19-nortestosterone, 10β,11β-dihydroxy-19-nor-17α-methyltestosterone and 10β,11β-dihydroxy-19-nor-17α-ethynyltestosterone for the 10β,11β-dihydroxy-19-nor-Δ⁴-androstene-3,17-dione, the following compounds are obtained: 10β-hydroxy-19-nor-Δ⁴-androstene-3,11,17-trione, 10β-hydroxy-11-keto-19-nor-17α-methyltestosterone and 10β-hydroxy-11-keto-19-nor-17α-ethynyltestosterone, respectively.

EXAMPLE 3

11-keto-estrone from 10β-hydroxy-19-nor-Δ⁴-androstene-3,11,17-trione

A solution of 20 mg. of 10β-hydroxy-19-nor-Δ⁴-androstene-3,11,17-trione in 5 ml. of glacial acetic acid, containing 15 mg. of concentrated sulfuric acid is heated in a boiling water bath for 30 minutes. After cooling, the reaction mixture is diluted with 40 ml. of water and the steroids are extracted three times with 10 ml. portions of chloroform. The chloroform phase was dried over anhydrous sodium sulfate and evaporated down to dryness to give crystalline 11-keto-estrone. It is recrystallized from acetone-*n*-hexane to give 16 mg. of the pure product, M.P. 222°–224° [α]$_D^{23}$+384° (C. 0.21, 95% ethanol).

This invention may be variously otherwise embodied within the scope of the appended claims.

What is claimed is:

1. A process for preparing 11-keto-estrone which comprises dehydrating 10β-hydroxy-19-nor-Δ⁴-androstene-3,11,17-trione with a strong acid.

2. The process of claim 1, wherein the strong acid is concentrated sulfuric acid in glacial acetic acid.

References Cited

UNITED STATES PATENTS 2,729,654   1/1956   Colton _____ 260—397.4
3,294,646   12/1966   Smith et al. _____ 195—51

OTHER REFERENCES

Djerassi, Steroid Reactions, Holden-Day, Inc., 1963, p. 385.

LEWIS GOTTS, Primary Examiner

ETHEL G. LOVE, Assistant Examiner

U.S. Cl. X.R.

195—51